Patented Dec. 16, 1941

2,266,018

UNITED STATES PATENT OFFICE 2,266,018

VAT DYESTUFFS

Maurice H. Fleysher and James Ogilvie, Buffalo, N. Y., assignors to National Aniline & Chemical Company, Inc., New York, N. Y., a corporation of New York No Drawing. Application November 29, 1939, Serial No. 306,681

10 Claims. (Cl. 8—34)

This invention relates to new and useful vat dyestuffs dyeing cotton gray to black shades and to processes of making them. It relates more particularly to vat dyestuffs which are derived from bis-(pyranthronylimino)-3,4,9,10-dinaphthoperylene-1',1"-diones which may be obtained by condensing two mols of a monoamino-pyranthrone with one mol of a dihalogen-substituted -3,4,9,10-dinaphthoperylene-1',1"- dione, and especially to vat dyestuffs which are derived from the bis-(pyranthronylimino)- dibenzanthrone which may be obtained by condensing two mols of monoamino-pyranthrone with one mol of the dibrom-dibenzanthrone obtainable by brominating dibenzanthrone in chlorsulfonic acid.

According to the present invention vat dyestuffs dyeing cotton brownish-gray to black shades which are fast to chlorine, light and washing are obtained by subjecting said bis-(pyranthronylimino)-dinaphthoperylene-diones to a carbazolizing treatment.

The carbazolizing treatment can be carried out by heating the bis-(pyranthronylimino)-dinaphthoperylene-dione with a condensing agent; e. g., aluminum chloride or alcoholic caustic potash.

As an aditional feature of the present invention, the carbazolization can be carried out by the treatment of the leuco form of the bis-(pyranthronylimino)- dinaphthoperylene - dione with an oxidizing condensing agent. Suitable oxidizing condensing agents are oxidizing agents which are readily soluble in water and which are effective as oxidants in alkaline solution; for example, sodium hypochlorite and potassium ferricyanide. In the practice of the present invention in accordance with the latter procedure, the compound to be carbazolized, preferably in a finely divided form (as obtained, for example by dissolving it in concentrated sulfuric acid and precipitating it by dilution of the sulfuric acid solution—so-called "acid pasting") is converted to the leuco form, and the leuco-compound is then treated with the oxidizing condensing agent. This new carbazolizing process has the advantage that it avoids the necessity of using such drastic agents and conditions as are necessary when using agents of the type of aluminum chloride and alcoholic caustic potash. As a result, the new process may be advantageously employed to form the carbazoles in situ on the material to be colored (dyed or printed). Thus the bis-(pyranthronylimino)-dinaphthoperylene-diones in the leuco form may be taken up by the fiber by the usual vat dyeing or printing processes, and then treated with an oxidizing condensing agent of the type above mentioned to form the carbazole on the material.

The following examples illustrate the invention. Parts are by weight and temperatures are in degrees centrigrade. The denatured alcohol is U. S. Formula 2B denatured alcohol.

*Example 1.*—In a suitable vessel made of iron and fitted with an agitator and condenser, a mixture of 256 parts of alcohol (denatured alcohol) and 1000 parts of flaked caustic potash is heated to form a uniform molten mass. To the molten mass, which is agitated and maintained at 150°, there are added, in uniform small portions over a period of about one-half hour, 250 parts of a bis-(pyranthronylimino)-dibenzanthrone obtained by condensing two mols of monoamino-pyranthrone resulting from the reduction with aqueous sodium sulfide of mono-nitro-pyranthrone obtained by the nitration of pyranthrone with fuming nitric acid in nitrobenzene (cf. German Patent 268,504), with one mol of the dibrom-dibenzanthrone resulting from bromination of dibenzanthrone in chlorsulfonic acid with bromine in the presence of iodine as a halogen carrier. Thereafter, the temperature of the fused mixture is raised to 170° to 175° and is held at this temperature for one and one-half to one and three-quarters hours. The hot molten mass is then run into cold water (about 20,000 parts), and the resulting aqueous mixture, which contains practically all of the carbazolized product in the leuco form, is kept at a temperature of about 20° to about 40°, and is aerated until the said leuco compound is completely oxidized, as shown by insolubility in water of the separated compound. The aqueous mixture is apt to foam during the aeration unless agitated. To reduce such foaming the usual expedients can be used; for example, addition of a small amount of Turkey red oil.

When oxidation is complete the aqueous mass is filtered and the dyestuff, which is in the form of an insoluble precipitate, is separated as the filter cake. To remove residual mother liquor as well as alkali-soluble and water-soluble impurities, the filter cake is washed with hot water (at about 65°) until it is neutral and the filtrate is clear. Filtration may be facilitated to some extent by rendering the aerated slurry slightly acid with sulfuric acid before filtering. In this case, it is desirable to neutralize the filter cake by washing it with a 2 per cent aqueous soda ash solution before finally washing the cake with hot water.

The carbazolized product, in its dry form, is a brownish-black powder which yields a blue solution in concentrated sulfuric acid, a brownish-violet solution in aniline, a red solution with strong orange fluorescence in ortho-dichlorobenzene, and a red solution with unusually intense fluorescence in nitrobenzene. It forms a reddish-violet aqueous vat from which cotton is dyed brownish-gray to black shades which are very fast to light, washing and chlorine.

While the exact formula of the carbazolized product is not known, and it is not intended to limit the product to any theoretical formula, the following formula in which Py represents the pyranthrone nucleus is believed to represent the product:

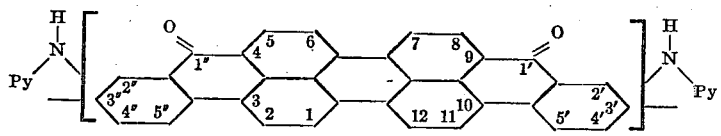

*Example 2.*—One part of the bis-(pyranthronylimino)-dibenzanthrone employed in Example 1 is dissolved in 10 parts of 100 per cent sulfuric acid at a temperature of 20 to 25°, the solution is poured rapidly into water, and the finely precipitated product is separated as a cake by filtration. The cake is washed with water until it is free of acid, and is then transferred to a vessel in which it is vatted with about 1 part of sodium hydrosulfite, 3 parts of 50 per cent aqueous caustic soda, and 100 parts of water at a temperature of about 40°. To the vat, about 35 parts of 10 per cent sodium hypochlorite solution are added, and the whole mixture is heated to about 80°, and held there until the hypochlorite is consumed or destroyed. The leuco dyestuff is thus oxidized to an insoluble carbazolized product which is separated by filtration in the usual manner. The filter cake of dyestuff is washed until neutral in the manner described in Example 1. Acidification of the oxidized slurry prior to filtration, and neutralization of the filter cake by means of dilute aqueous soda ash solution prior to the final washing may also be included if desired.

The carbazolized product, in its dry form, is substantially identical with the product of Example 1. It dyes cotton brownish-gray to black shades of excellent fastness to light, washing and chlorine from a reddish-violet aqueous vat.

If the process of this example is to be employed as part of a dyeing operation, the material to be dyed (for example, cotton or regenerated cellulose yarn or piece goods) may be worked in the vat of the leuco bis-(pyranthronylimino)-dibenzanthrone, then treated with the hypochlorite solution and further treated as described.

In place of sodium hypochlorite, potassium ferricyanide can be used, in the ratio of 3 parts of potassium ferricyanide for each part of sodium hypochlorite, with the same results.

*Example 3.*—A fused agitated mixture of 80 parts of anhydrous aluminum chloride and 20 parts of common salt is maintained at about 140° to 145° while 20 parts of bis-(pyranthronylimino)-dibenzanthrone are added slowly and uniformly over a period of about twenty minutes. The temperature is then raised to from 145° to 150°, and agitation of the mass is continued at this temperature for about one-half hour. The mass is then poured into a hot dilute aqueous sulfuric acid solution, containing 70 parts of 66° Bé. sulfuric acid and about 2000 parts of water heated to about 80°. The resulting slurry is boiled for about 30 minutes, then filtered. The filter cake is washed with water until it is acid-free, then it is washed with a 2 per cent aqueous soda ash solution, and finally with hot water until it is alkali-free. The carbazolized product thus obtained is substantially identical with those of Examples 1 and 2, but is somewhat brighter in all its color reactions. Thus cotton is dyed bright steel-gray as compared with brownish-gray dyeings obtained with the products of Examples 1 and 2.

The filter cakes resulting from the processes of the above examples can be admixed in the usual manner with dispersing agents, diluents, and/or assistants, etc. to form pastes adjusted to a known vat dye content, which may be used in the usual manner of vat dye pastes for dyeing, printing, etc. If desired, the filter cakes may be further processed. For example, after admixing with suitable diluents, dispersing agents, and/or assistants, they may be dried, ground and standardized in powder form.

It will be realized by those skilled in the art that the invention is not limited to the details of the above illustrative examples and that changes may be made without departing from the scope of the invention.

Thus, instead of the bis-(pyranthronylimino)-dibenzanthrone employed in the above examples, other bis-(pyranthronylimino)-3,4,9,10-dinaphthoperylene-1',1''-diones may be employed; as for example, other bis-(pyranthronylimino)-dibenzanthrones and bis-(pyranthronylimino)-isodibenzanthrones. Said bis-(pyranthronylimino)-dinaphthoperylene-diones and processes for their preparation are the subject of copending application Serial No. 306,682 of James Ogilvie.

The conditions and manner of the carbazolization treatment of the intermediate bis-(pyranthronylimino)-3,4,9,10-dinaphthoperylene-1',1''-diones may be varied depending upon the particular form in which the product is desired. If the black vat dye of the present invention is desired in a form producing dyeings having a greenish cast, the carbazolization of the intermediate is carried out with an acid condensing agent as illustrated in foregoing Example 3; whereas, if the vat dye is desired in the form producing dyeings having a reddish cast, the carbazolization of the said intermediate is carried out in alkaline media as illustrated in Examples 1 and 2. Presumably the color of the dyeings is influenced by the nature and amount of uncarbazolized intermediate and of by-products which are contained in the final product, and which vary in nature and quantity depending upon the specific conditions of the treatment.

In the alkaline fusion described in foregoing Example 1, other alkaline condensing agents of the type usually employed for the conversion of an anthrimide to a carbazole may be used; for example, sodium hydroxide, a mixture of sodium hydroxide and potassium hydroxide, sodium or potassium anilide, and sodium or potassium amide.

As is usual in reactions of this type, the extent to which the carbazolizing treatment is carried out will vary with the condensing agent and with the temperature employed. In the alkaline fusion of Example 1, formation of the desired product ordinarily will be found to be complete when the fusion mass is maintained at 160° to 180° C. for from 1 to 2½ hours after the addition of the intermediate to the fusion mass. In general, the fusion must be continued for at least one-half hour after addition of the intermediate in order to obtain a satisfactory result. Fusion temperatures from about 110° C. to 160° C. may be used, but necessitate a correspondingly longer fusion.

In the aluminum chloride fusion of Example 3, as well as in the alkali fusion of Example 1, fusion temperatures which are substantially higher than 180° C. generally cause decomposition and loss of yield and are therefore preferably avoided. Prolongation of the fusion periods of the aforesaid examples to about 7 hours is without substantial effect upon the product, but further heating generally causes progressive decomposition.

In Example 3, the use of sodium chloride in the fusion mass is not essential, but is preferred, since sodium chloride lowers the melting point of the mixture and thus permits fusion at lower temperatures. Use of the lower fusion temperatures results in the formation of products which are purer than those obtained at the temperatures which are required when aluminum chloride is used without a flux. Other fluxing agents may be employed instead of sodium chloride; for example, antimony trichloride, pyridine, urea, etc.

At temperatures from 140° C. to 150° C., the aluminum chloride fusion is generally complete one-half hour after addition of the intermediate. In order to obtain a satisfactory product, the duration of the fusion after addition of the intermediate should be not substantially less than one-quarter hour. Temperatures below 140° C. but not substantially below 70° C. may be employed providing a fluxing agent is used which maintains the fusion mass in a fluid condition throughout the reaction, and providing the fusion period is correspondingly increased.

In the procedure according to Example 2, which illustrates carbazolization of the dyestuff intermediate by treatment of the corresponding leuco derivative with an oxidizing condensing agent, e. g., sodium hypochlorite, the step of acid pasting the intermediate before reducing it to the leuco derivative is included in order to insure a sufficiently fine state of subdivision to permit rapid and complete reduction of the said intermediate by means of aqueous alkaline hydrosulfite. The purity of the intermediate is also improved by acid pasting. If the said intermediate is already sufficiently finely divided to allow complete reduction by means of the vatting agent, the step of acid pasting may be omitted. Moreover, other methods of acid pasting known to the art may be employed, and similarly, alkaline vatting agents other than aqueous sodium hydrosulfite and caustic soda may be used to reduce the intermediate to the leuco compound.

In the procedure of Example 2, the oxidation is preferably carried out by treatment of the leuco compound of the intermediate with an aqueous solution of an oxidizing condensing agent, as hereinbefore defined, at temperatures from about 50° C. to the boiling point of the solution. However, when alkali metal hypochlorites are used, temperatures above 80° C. are preferably avoided in order to prevent excessive spontaneous decomposition of the oxidizing agent. If the oxidizing condensing agent is strongly reactive, as in the case of the alkali metal hypochlorites, temperatures as low as room temperature (e. g., 20° C.) may be used successfully. The reaction with sodium hypochlorite according to Example 2 is substantially complete in 2 or 3 minutes.

The oxidation of the leuco compound which is present in the fusion mass resulting from the condensation in Example 1 can be effected by other well-known methods.

In each of the examples, the final product may be purified if desired by well-known methods of further treatment. Such treatments include acid pasting, for instance, according to the process of U. S. P. 2,026,623; and similarly, treatment of the dyestuff with small amounts of oxidizing agents in mildly acid or alkaline solution. For instance, small amounts of hydrogen peroxide, or alkali metal hypochlorites, perborates or persulfates may be used in the presence of weak alkalies, and small amounts of nitrites, alkali metal chromates or bichromates, etc., may be used in weakly acid solutions.

We claim:

1. A vat dyestuff which is a carbazolized bis-(pyranthronylimino)-dinaphthoperylene-dione.

2. A vat dyestuff which is a carbazolized bis-(pyranthronylimino)-dibenzanthrone.

3. A vat dyestuff which is a carbazolization product of the bis-(pyranthronylimino)-dibenzanthrone resulting from the condensation of two mols of monoamino-pyranthrone, obtained by reducing the mononitro-pyranthrone resulting from the nitration of pyranthrone with nitric acid in nitrobenzene, with one mol of the dibromdibenzanthrone obtained by brominating dibenzanthrone in chlorsulfonic acid, said vat dyestuff being a brownish-black powder giving a blue solution in concentrated sulfuric acid, a brown-violet solution in aniline, a red solution with strong orange fluorescence in ortho-dichlorbenzene, a red solution with strong fluorescence in nitrobenzene, and dyeing cotton from a red-violet vat gray to black shades that are fast to light, washing and chlorine.

4. A method of making a vat dyestuff which comprises carbazolizing a leuco bis-(pyranthronylimino)-dinaphthoperylene-dione by treatment with an oxidizing condensing agent.

5. A method of making a vat dyestuff which comprises carbazolizing a leuco bis-(pyranthronylimino)- 3,4,9,10-dinaphthoperylene-1',1''-dione with sodium hypochlorite.

6. A method of making a vat dyestuff which comprises carbazolizing a leuco bis-(pyranthronylimino)-dibenzanthrone by treatment with an oxidizing condensing agent.

7. A method of making a vat dyestuff which comprises carbazolizing a leuco bis-(pyranthronylimino)-dibenzanthrone by treatment with sodium hypochlorite.

8. A process of coloring fibrous material gray to black shades which comprises impregnating the material with a leuco bis-(pyranthronylimino)- 3,4,9,10-dinaphthoperylene -1',1''- dione and then carbazolizing the leuco bis-(pyranthronylimino)-dinaphthoperylene-dione by treating the impregnated material with an oxidizing condensing agent.

9. A process of coloring fibrous material gray to black shades which comprises impregnating the material with a leuco bis-(pyranthronylimino)-dibenzanthrone and then carbazolizing the leuco bis-(pyranthronylimino)-dibenzanthrone by treating the impregnated material with an oxidizing condensing agent.

10. A process of coloring fibrous material gray to black shades which comprises impregnating the material with a leuco bis-(pyranthronylimino)-dibenzanthrone and then carbazolizing the leuco bis-(pyranthronylimino)-dibenzanthrone by treating the impregnated material with sodium hypochlorite.

MAURICE H. FLEYSHER.
JAMES OGILVIE.

CERTIFICATE OF CORRECTION.

Patent No. 2,266,018. December 16, 1941.

MAURICE H. FLEYSHER, ET AL.

It is hereby certified that error appears in the printed specification of the above numbered patent requiring correction as follows: Page 1, second column, line 14, for "150°" read --160°--; and that the said Letters Patent should be read with this correction therein that the same may conform to the record of the case in the Patent Office.

Signed and sealed this 10th day of February, A. D. 1942.

(Seal)

Henry Van Arsdale,
Acting Commissioner of Patents.